(12) United States Patent
Kim

(10) Patent No.: US 8,060,092 B2
(45) Date of Patent: Nov. 15, 2011

(54) APPARATUS AND METHOD FOR HANDOVER BETWEEN HETEROGENEOUS SYSTEMS

(75) Inventor: Jong Yol Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 773 days.

(21) Appl. No.: 12/131,895

(22) Filed: Jun. 2, 2008

(65) Prior Publication Data

US 2009/0047963 A1 Feb. 19, 2009

(30) Foreign Application Priority Data

Aug. 16, 2007 (KR) .................. 10-2007-0082362

(51) Int. Cl.
*H04W 36/00* (2009.01)
*H04W 24/00* (2009.01)
(52) U.S. Cl. .................... 455/436; 455/456.1
(58) Field of Classification Search .............. 455/432.1, 455/436, 437, 440, 442–448
See application file for complete search history.

(56) References Cited

U.S. PATENT DOCUMENTS

| | | | |
|---|---|---|---|
| 6,385,454 B1 * | 5/2002 | Bahl et al. ............... | 455/450 |
| 6,957,074 B2 * | 10/2005 | Wang et al. ............. | 455/456.1 |
| 7,257,405 B2 * | 8/2007 | Yamato et al. .......... | 455/445 |
| 7,272,405 B2 * | 9/2007 | Maillard ................. | 455/456.5 |
| 2005/0239443 A1 * | 10/2005 | Watanabe et al. ....... | 455/414.1 |
| 2005/0249161 A1 * | 11/2005 | Carlton .................. | 370/331 |
| 2006/0140150 A1 | 6/2006 | Olvera-Hernandez et al. | |

FOREIGN PATENT DOCUMENTS

| | | |
|---|---|---|
| EP | 1 253 796 A2 | 10/2002 |
| JP | 2005-333648 A | 12/2005 |
| KR | 10-2005-0015859 A | 2/2005 |
| KR | 10-2005-0038736 A | 4/2005 |
| KR | 10-2005-0078627 A | 8/2005 |
| KR | 10-2005-0089692 A | 9/2005 |
| KR | 10-2005-0113469 A | 12/2005 |
| KR | 10-2006-0046019 A | 5/2006 |
| KR | 10-2006-0121634 A | 11/2006 |
| KR | 10-2007-0015803 A | 2/2007 |
| WO | 2004/012468 A1 | 2/2004 |

* cited by examiner

*Primary Examiner* — Lester Kincaid
*Assistant Examiner* — Joel Ajayi
(74) *Attorney, Agent, or Firm* — Jefferson IP Law, LLP

(57) ABSTRACT

An apparatus and method for enhanced heterogeneous network handover using a media independent handover scheme is provided. A heterogeneous network handover method of the present invention includes generating, at a mobile node, self-location information, transmitting the self-location information to a management server which manages heterogeneous networks, searching, at the management server, surrounding networks using the self-location information, composing a set of candidate networks including at least one of the surrounding networks, transmitting information on the set of candidate networks to mobile node and deciding, at the mobile node, a target handover network among the candidate networks. Accordingly, latency during handover in a heterogeneous network can be reduced.

20 Claims, 5 Drawing Sheets

APPARATUS AND METHOD FOR HANDOVER BETWEEN HETEROGENEOUS SYSTEMS

PRIORITY

This application claims the benefit under 35 U.S.C. §119 (a) of a Korean patent application filed in the Korean Intellectual Property Office on Aug. 16, 2007 and assigned Serial No. 2007-0082362, the entire disclosure of which is hereby incorporated by reference.

BACKGROUND OF THE INVENTION

1. Field of the Invention

The present invention relates to an apparatus and method for handover between heterogeneous networks. More particularly, the present invention relates to an apparatus and method that provide enhanced heterogeneous network handover using a media independent handover scheme.

2. Description of the Related Art

Handover, or handoff, is a technical procedure for switching a call in progress from the radio coverage area of one base station to another base station while ensuring the continuity of the established call.

Handover is commonly performed when user equipment, currently in an active communication session, moves between the cells of a homogenous system. With the deployment of various heterogeneous system networks, advanced handover techniques for supporting handover between heterogeneous networks have been developed. Handover between heterogeneous networks (also known as vertical handover) means an inter-technology handover such as a switch between a WiBro network and another standard system network, such as a 2nd generation (2G) network, a 3rd generation (3G) network, or a wireless local area network (WLAN) based on the Institute of Electrical and Electronics Engineers 802.11 (IEEE 802.11) standards.

Media Independent Handover (MIH) is a standard being developed as part of the IEEE 802.21 standard to enable handover in a heterogeneous network environment. MIH is a seamless intermediate handover technique guaranteeing quality of service (QoS) between heterogeneous networks regardless of media types. MIH provides Event Services, Command Services and Information Services for allowing a mobile node having multiple radio interfaces to switch the communication session in progress to an optimal network regardless of media type without requiring user interface. With such services, the upper layers can perform a handover to an optimal network.

FIG. 1 illustrates message flows in a conventional inter-system handover procedure. In FIG. 1, a mobile node (MN) 100 is attempting a handover from a WLAN to a wireless metropolitan area network (WMAN).

Referring to FIG. 1, a mobile node (MN) 100 is serviced by a WLAN 101 as a serving network in step S110. If a link status changes, the MN 100 transmits an MIH get information request message (MIH_Get_Information.request) to neighbor networks via an MIH Information Service (MIIS) server 102 in step S115. The change of link status is determined by comparing a link parameter value with a threshold value. If the link parameter value is greater than the threshold value, it is determined that a change of link status has occurred. The high link parameter value indicates that the received signal strength is weak. Accordingly, the MN 100 determines information about neighboring networks, such as received signal strengths of the different networks, and prepares to perform a handover to the neighboring network having an optimal state. The MIH_Get_Information.request message is formatted as follows and the parameters of the MIH_Get_Information.request message are defined as in table 1.

MIH_Get_Information.request (
    InfoQueryType,
    InfoQueryParameters
)

TABLE 1

| Name | Type | Valid Range | Description |
|---|---|---|---|
| InfoQueryType | An integer value corresponding to one of the following types:<br>1: TLV<br>2: RDF_DATA<br>3: RDF_SCHEMA_URL<br>4: RDF_SCHEMA | N/A | The type of query that is specified |
| InfoQueryParameters | Query type specific parameters | N/A | Query type specific parameters which indicate the type of information the client may be interested in. |

The MIH_Get_Information.request is transmitted by MN 100 to request information related to a specific interface, attributes to the network interface as well as entire network capability.

As shown in table 1, integer values of the InfoQueryType parameter of the MIH_Get_Information.request respectively correspond to TLV, RDF_DATA, RDF_SCHEMA_URL, and RDF_SCHEMA.

When the InfoQueryType is specified as TLV, the InfoQueryParameters is a binary string. When the InfoQueryType is specified as RDF_DATA, the InfoQueryParameters is a string which contains a SPARQL (Protocol and RDF Query language) query where the SPARQL query is supposed to contain an appropriate query for obtaining expected RDF/XML data. When the InfoQueryType is specified as RDF_SCHEMA_URL, the InfoQueryParameters is a null string. Finally, when InfoQueryType is specified as RDF_SCHEMA, the InfoQueryParameters carries either the URL of the extended schema the query originator wants to obtain or a null string when the URL of the extended schema is unknown.

In response to the MIH_Get_Information.request message, the MIIS server 102 transmits an MIH get information response message (MIH_Get_Information.response) to the MN 100 in step S117. The MIH_Get_Information.response message includes information on the candidate networks that are selected by the MIIS server 102 in consideration of the location of the MN 100. Upon receiving the MIH_Get_Information.response message, the MN 100 determines link relief information in step S120. That is, the link layer of the MN 100 notifies that the current link established by MIH is released within a predetermined time. Accordingly, the MN 100 determines another link to perform handover to a new cell, i.e. a new network.

Next, the MN 100 receives information required for a new connection from WMANs 103 and 104 as the candidate networks in steps S125 and S126. For simplifying the explanation, it is assumed that two WiBro networks based on the IEEE 802.16 standard are selected as the candidate networks in FIG. 1. However, the number of the candidate networks can be changed and other the types of networks, such as cellular networks and WLANs, can be utilized.

Since the candidate networks 103 and 104 are WiBro networks, the connection information includes Downlink MAP (DL MAP), Uplink MAP (UL MAP), Downlink Channel Descript (DCD), and Uplink Channel Descript (UCD).

If the network connection information is collected, the MN 100 performs a link scanning on the links of the candidate networks 103 and 104 in step S130 and then transmits a candidate query request message (Candidate_Query.request) including the information on the candidate networks 103 and 104 to the serving network 101 in step S132. The Candidate_Query.request includes a link type identifier, network identifiers of the candidate networks, and information about operations required for the current link after handover. Upon receiving the Candidate_Query.request message, the serving network 101 transmits a handover (HO) query resource request message (Query_Resource.request) to the candidate networks 103 and 104 in steps S135 and S136. The candidate networks are selected in consideration of the location of the MN 100, and the number and types of candidate networks are not limited to the example of FIG. 1. In a case where five candidate networks are reported by the MIIS server 102, the serving network 101 requests the radio resource information for handover to the five candidate networks.

In response to the Query_Resource.request, the respective candidate networks 103 and 104 transmit a query resource response message (Query_Resource.response) containing information on their resources to the service network 101 in steps S137 and S138. Particularly, the handover resource information response message may include handover acceptability for the MN 100. The serving network 101 determines one of the candidate networks as an optimal network for handover in consideration of the handover acceptability and resource status of the candidate networks 103 and 104. Next, the serving network 101 transmits a Candidate_Query.response containing information on the HO target network to the MN 100 in step S140.

Assuming that the candidate network 103 is selected as the handover target network, the MN 100 performs operations for establishing a connection to the target network 103. Since the handover target network 103 is a WiBro network, the MN 100 performs a ranging process for establishing a connection link in step S145. After completing the ranging process, the MN 100 determines successful handover completion in step S147 and is served by the new serving network 103 in step S150. Here, the communication link to the old service network 101 is released. In this manner, the vertical handover between heterogeneous networks is performed.

As described above, in the vertical handover specified by the IEEE 802.21 standard, the MN transmits MIH_Get_Information.request to the MIIS server whenever a handover to a new cell is required, and the MIIS server collects information on the networks in a core network and determines the existence of available heterogeneous networks for handover. The MIIS server transmits the network status information to the MN using the MIH_Get_Information.response message.

In the conventional standard specification, when a handover is required due to the movement of the MN, the core network predicts a location of the MN using a prediction algorithm and informs the MN of whether a handover to a heterogeneous network is available. In the heterogeneous network environment, however, the network resource management for the vertical handover is very complicated and inefficient real time handover traffic may cause significant network problems. Such problems increase latency and deteriorate communication reliability. That is, the conventional vertical handover method is limited in efficient handover performance due to the latency and communication reliability caused by inaccurate user location and mobility estimated by the core network.

SUMMARY OF THE INVENTION

An aspect of the present invention is to address at least the above-mentioned problems and/or disadvantages and to provide at least the advantages described below. Accordingly, an aspect of the present invention is to provide a handover method and system in a heterogeneous network environment.

Another aspect of the present invention is to provide a media independent handover method and system that are capable of improving handover efficiency in a heterogeneous network environment.

In accordance with an aspect of the present invention, a handover method in a heterogeneous network environment is provided. The method includes generating, at a mobile node, self-location information, transmitting the self-location information to a management server which manages heterogeneous networks, searching, at the management server, surrounding networks using the self-location information, composing a set of candidate networks including at least one of the surrounding networks, transmitting information on the set of candidate networks to mobile node and deciding, at the mobile node, a target handover network among the candidate networks.

In accordance with another aspect of the present invention, a heterogeneous network handover method is provided. The method includes generating, by a mobile node having multiple standard interfaces, self-location information and self-travel route prediction information, transmitting the self-location information and self-travel route prediction information to a management server which manages heterogeneous networks, searching, at the management server, surrounding networks using the self-location information and self-travel route prediction information, selecting handover candidate networks from among the surrounding networks searched along a travel route extracted from the self-travel route prediction information, transmitting information on the candidate networks to the mobile node and performing, at the mobile node, a handover to one of the candidate networks.

In accordance with yet another aspect of the present invention, a heterogeneous network handover system is provided. The system includes at least one mobile node for communicating with multiple heterogeneous networks, for generating self-location information, for transmitting the self-location information to a core network, and for performing a handover on the basis of candidate network information received from the network and a management server for managing the heterogeneous networks, for searching surrounding networks using the self-location information received from the mobile node, for selecting at least one of surrounding networks as a set of handover candidate networks, and for transmitting information on the candidate networks to the mobile node.

In accordance with still another aspect of the present invention, a heterogeneous network handover apparatus is provided. The apparatus includes a plurality of radio interfaces for communication with heterogeneous networks, a self-location information generator for generating self-location information and self-travel route prediction information and a media independent handover function for transmitting a surrounding network information request message containing the self-location information and self-travel route prediction information to a heterogeneous network management server and receiving a reply message in response to the surrounding network information request message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
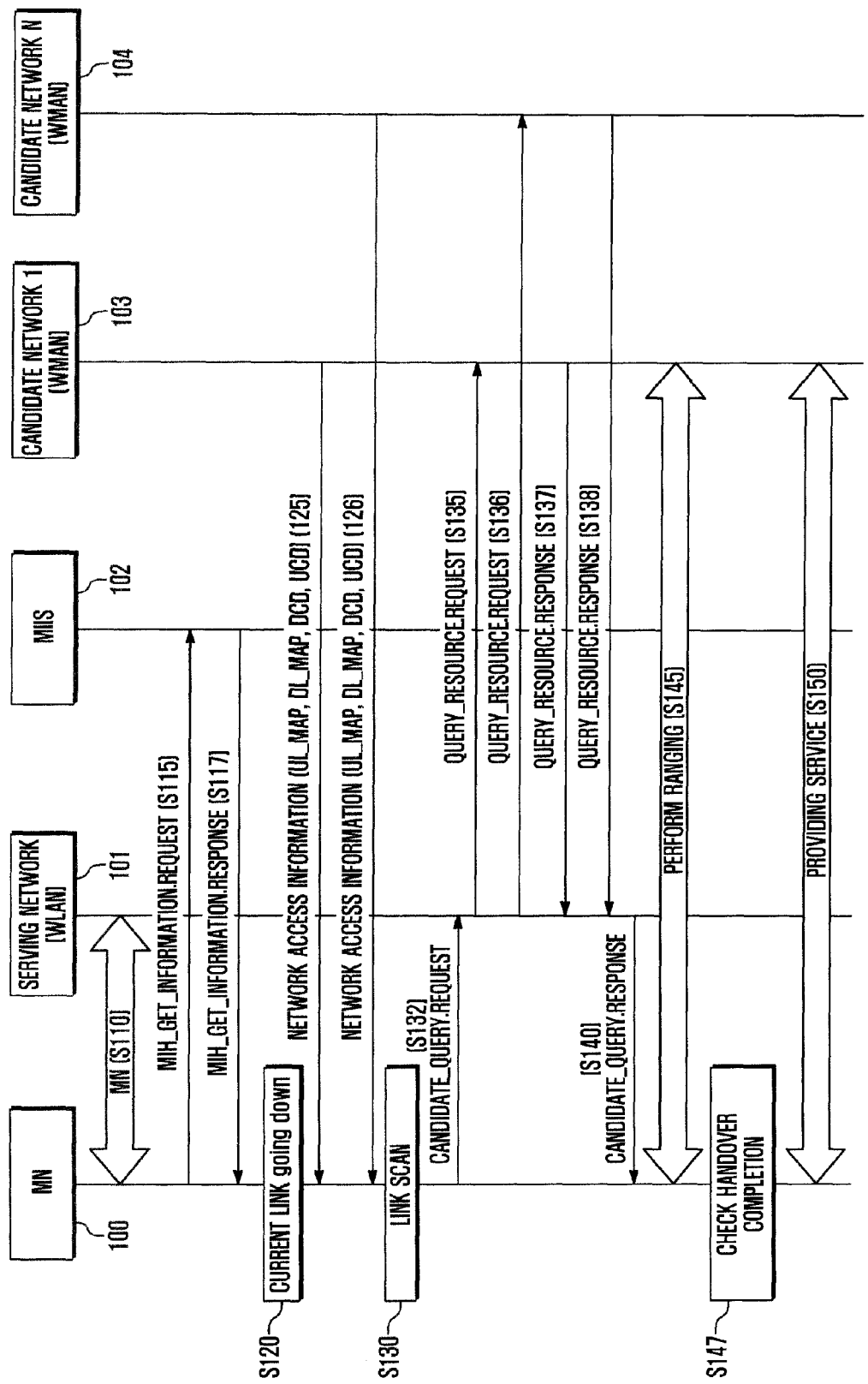
FIG. 1 is a flowchart illustrating message flows in a conventional inter-system handover procedure.
Figure 2:
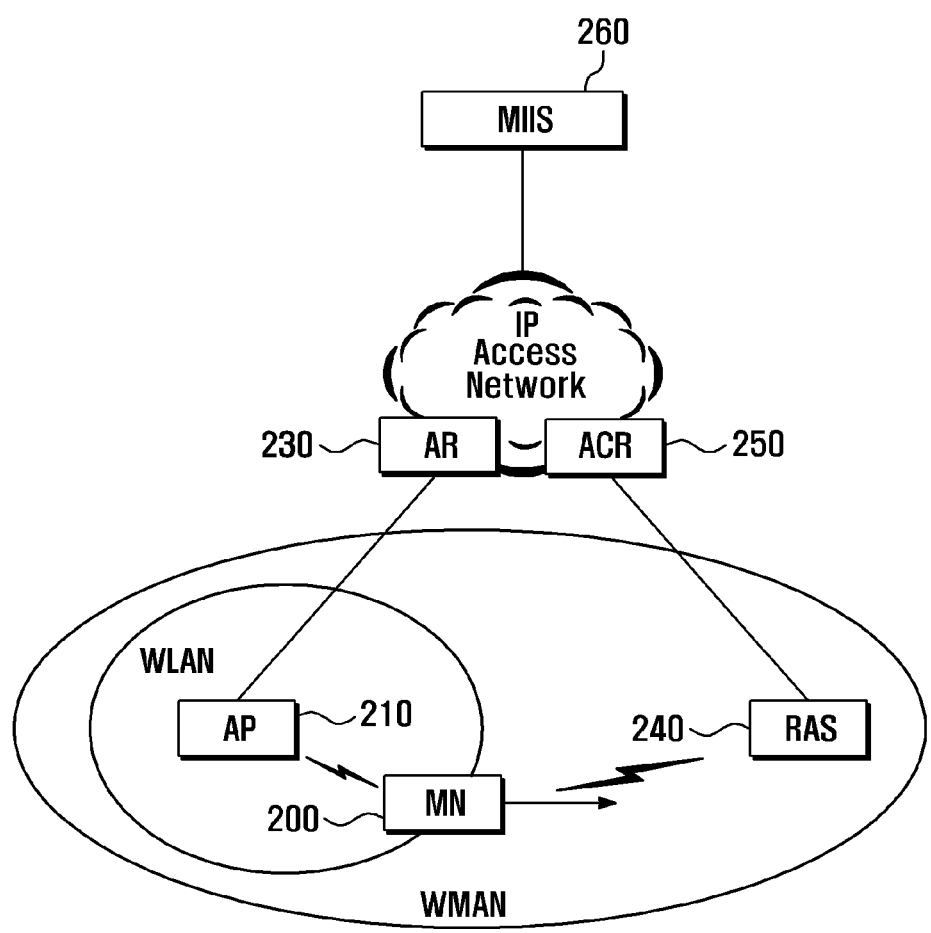
FIG. 2 is a schematic diagram illustrating MIH system architecture according to an exemplary embodiment of the present invention.

FIG. 2 is a schematic diagram illustrating MIH system architecture according to an exemplary embodiment of the present invention. In FIG. 2, the system architecture includes an IEEE 802.11 WLAN and an IEEE 802.16 WMAN. However, the handover system and method of the present invention are not limited thereto. For example, the handover system and method of the present invention can be applied to an MIH system architecture in which other types of WLANs and WMANs and cellular networks coexist.

Referring to FIG. 2, an MN 200 is connected to the Internet via an access point (AP) 210 of the WLAN and an access router (AR) 230 of an Internet Protocol (IP) access network. The AR 230 is responsible for IP routing of packets from the MN 200 and acts as a Foreign Agent (FA). The AP 210 communicates with the MN 200 over the WLAN access protocol and acts as a bridge between the WLAN and a wired network.

As illustrated in FIG. 2, the WLAN coverage area is overlapped with the WMAN coverage area and the MN 200 moves out of the radio coverage of the AP 210 so as to enter the WMAN area. The WMAN area is defined by the radio coverage of a Radio Access Station (RAS) 240 which provides access service to the MN 200 and manages radio resource. The RAS 240 also provides authentication and security functions. An Access Control Router (ACR) 250 is connected to the IP access network. The ACR is responsible for IP routing and mobility management and performs IP multicast, billing, and mobility control functions.

A MIIS 260 is placed on a core network and is responsible for managing network resources for supporting handover between the heterogeneous networks. In an exemplary embodiment of the present invention, the MIIS collects the information on the heterogeneous networks connected to the IP access network and provides the network information to the MN 200 in response to a network information request message. Although not shown in FIG. 2, an Authentication, Authorization, and Accounting (AAA) function is further included in the architecture for performing packet encapsulation as a router of a home network and for authenticating a Home Agent (HA) which performs data tunneling to a currently registered address of the MN and the MN's access.

In an exemplary embodiment, the MN 200, AP 210 of the WLAN, and RAS 240 of the WMAN are provided with MIH functions so as to provide MIH services.

Figure 3:
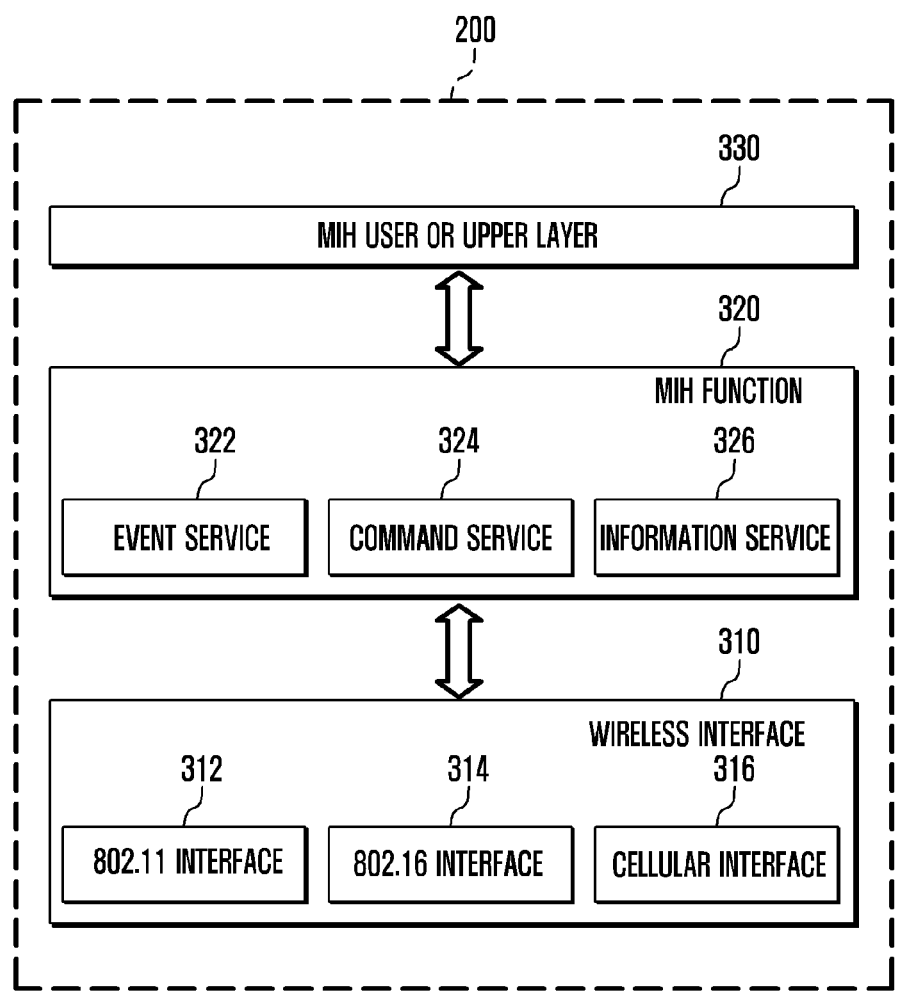
FIG. 3 is a block diagram illustrating an MN having multiple radio interfaces for supporting MIH between heterogeneous networks according to an exemplary embodiment of the present invention.

FIG. 3 is a block diagram illustrating an MN having multiple radio interfaces for supporting MIH between heterogeneous networks according to an exemplary embodiment of the present invention. Such MIH functions are supported by other network elements. Although the network elements of the respective networks, equivalent to the base stations, are described with the MIH functions in this example, the present invention is not limited thereto.

Referring to FIG. 3, the MN 200 includes a wireless interface unit 310 which is capable of supporting multiple radio interfaces, an MIH function unit 320, and an MIH user unit (or upper layer unit) 330. The wireless interface unit 310 is provided with the Physical layer (PHY) and Media Access Control (MAC) layer. In this example, the wireless interface unit 310 is provided with an IEEE 802.11 interface 312 for supporting connection to an IEEE 802.11 WLAN, an IEEE 802.16 interface 314 for supporting connection to an IEEE 802.16 WMAN, and a cellular interface 316 for supporting connection to a cellular network. Of course, other types of radio interfaces can be included in the wireless interface unit 310 in addition to the IEEE 802.11 interface, IEEE 802.16 interface, and cellular interface.

The MIH function unit 320 provides services to the upper layer unit 330 through a single technology-independent interface and obtains services from the wireless interface unit 310 through a variety of technology-independent interfaces. The MIH function unit 320 includes an event service module 322, a command service module 324, and an information service module 326.

The event service module 322 provides event classification, event filtering and event reporting corresponding to dynamic changes in link characteristics, link status, and link quality. The event service module 322 also exchanges the event information with the base stations. Here, the base stations may include the AP of a WLAN, an RAS of a WiBro network, a Node B of a Wideband Code Division Multiple Access (WCDMA) network and a Base Transceiver Station (BTS) of a Code division Multiple Access 2000 (CDMA2000) network. The command service module 324 provides the command service which enables MIH users to manage and control link behavior relevant to handovers and mobility. The information service module 326 provides details on the characteristics and services provided by the serving and surrounding networks. The information enables effective system access and effective handover decisions. In an exemplary implementation as illustrated in FIG. 3, the information service module 326 of the MN 200 provides information on the current location and predicted route of the MN. This information is contained in the network information request message. Accordingly, the MN can quickly receive the information of the surrounding networks and perform handover accurately on the basis of the received information.

The upper layer unit 330 makes use of the services provided by the MIH function unit 320. The upper layer unit 330 enables an upper layer application to be seamlessly serviced especially in handover by assistance of the MIH function unit 320.

Figure 4A:
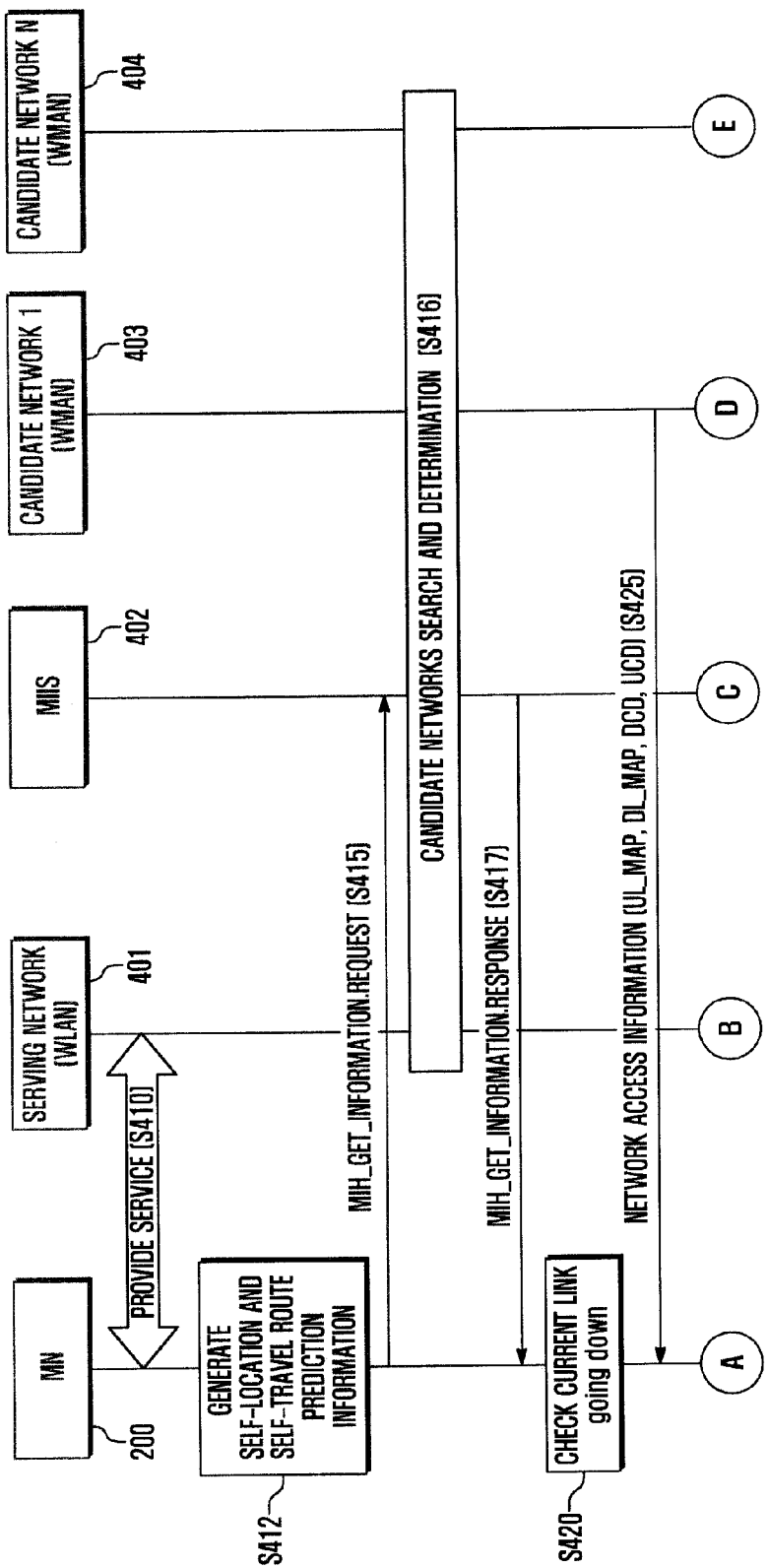
FIGS. 4A and 4B are a message flow diagram illustrating a handover method in a heterogeneous network environment according to an exemplary embodiment of the present invention.
Figure 4B:
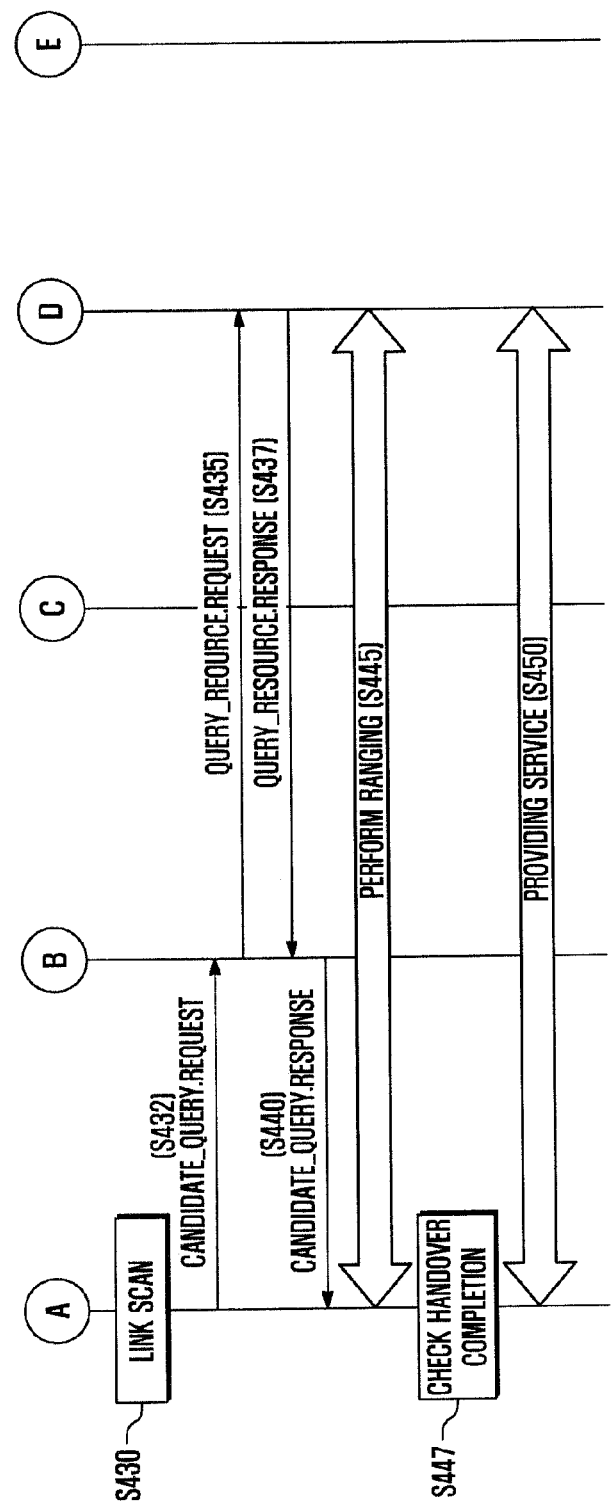

FIGS. 4A and 4B are a message flow diagram illustrating a handover method in a heterogeneous network environment according to an exemplary embodiment of the present invention. In the illustrated example, the handover method is described with a situation in which the MN 200 switches the current WLAN link to a WMAN link. Of course, this is for example only an in no way limits the application of the present invention.

Referring to FIGS. 4A and 4B, an MN 200 is served by a serving network (WLAN) 401 in step S410. If a state of the link connected to the WLAN 401 deteriorates, the MN 200 requests an MIIS 402 for information about surrounding networks. In more detail, the wireless interface unit 310 of FIG. 3 detects the change of the link status of the 802.11 interface 312 and reports the link status change to the MIH function unit 320. The link status change is detected by comparing a link parameter value to threshold value. If the link parameter value exceeds the threshold value, the wireless interface unit 310 determines that the link state is changed. The change of the link status means, for example, that the received signal strength of the current link is weak. Of course, a change in the link status could indicate deterioration of other parameters. Accordingly, the MN 200, particularly, the MIH function unit 320 requests information on the surrounding networks in order to prepare for a handover from the current serving network 401 to another network. The MIH function unit 320 requests the MIIS 402 for the surrounding network information using the MIH information service. In this manner, the MN 200 determines the surrounding network information such as received signal strengths and attempts a handover to one of the surrounding networks having an optimal condition for providing services to the MN 200. In this example, the MN 200 transmits accurate information on its location to the MIIS 401 through the surrounding network information request message.

The MN 200, particularly, the MIH function unit 320 generates its own location information and routing information in step S412 and transmits MIH_Get_Information.request containing the location and routing information to the MIIS 402 in step S415. The MIH_Get_Information.request message is formatted as follows and the parameters of the MIH_Get_Information.request message are as in table 2.

```
MIH_Get_Information.request (
                InfoQueryType,
                InfoQueryParameters,
                MIH_LOCATION_REPORT,
                MIH_ROUTE_REPORT
                )
```

TABLE 2

| Name | Type | Valid Range | Description |
|---|---|---|---|
| InfoQueryType | An integer value corresponding to one of the following types:<br>1: TLV<br>2: RDF_DATA<br>3: RDF_SCHEMA_URL<br>4: RDF_SCHEMA | N/A | The type of query that is specified |
| InfoQueryParameters | Query type specific parameters | N/A | Query type specific parameters which indicate the type of information the client may be interested in. |
| MIH_LOCATION_REPORT | String | N/A | Specifies the location information of Mobile Node |
| MIH_ROUTE_REPORT | String | N/A | Specifies the routing information of Mobile Node in future |

In another exemplary embodiment of the present invention, the MIH_Get_Information.request is formatted as follow and the parameters of the MIH_Get_Information.request are defined as in table 3.

```
MIH_Get_Information.request (
                DestinationIdentifier,
                InfoQueryBinaryDataList,
                InfoQueryRDFDataList,
                InfoQueryRDFSchemaURL,
                InfoQueryRDFSchemaList,
                MaxResponseSize,
                MIH_LOCATION_REPORT,
                MIH_ROUTE_REPORT
                )
``` location of the MN 200 using a Location-Based Service (LBS). The parameter MIH_LOCATION_REPORT indicates the current location of the MN 200 which is formatted as coordinate information such as latitude and longitude coordinates used in a Global Positioning System (GPS). The format of the location information should be defined in common with the MIIS 402. Since the location information of the MN 200 is transmitted to the core network, the MIIS 402 obtains an accurate location of the MN 200 without querying or estimating the location of the MN 200. Accordingly, the MIIS 402 can evaluate the surrounding networks more accurately, whereby the core network can prepare a handover procedure in advance and, in turn, minimize the handover latency.

The parameter MIH_ROUTE_REPORT indicates a routing path of the MN 200 predicted from the current location. For example, in a case where the MN is enabled by GPS, the

TABLE 3

| Name | Type | Description |
|---|---|---|
| Destination Identifier | MIF_ID | The local MIHF or a remote MIHF which will be the destination of this request. |
| Info Query Binary Data List | LIST(INFO_QUERY_BINARY_DATA) | (Optional) A list of binary queries. The order of the queries in the list identifies the priority of the query. The first query has the highest priority to be processed by MIIS. |
| Info Query RDF Data List | LIST(INFO_QUERY_RDF_DATA) | (Optional) A list of RDF queries. The order of the queries in the list identifies the priority of the query. The first query has the highest priority to be processed by MIIS. |
| Info Query RDF Schema URL | NULL | (Optional) An RDF Schema URL query. |
| Info Query RDF Schema List | LIST(INFO_QUERY_RDF_SCHEMA) | (Optional) A list of RDF schema queries. The order of the queries in the list identifies the priority of the query. The first query has the highest priority to be processed by MIIS. |
| Max Response Size | UNSIGNED_INT(2) | (Optional) This field specifies the maximum size of Info Response parameters (i.e., Info Response Binary Data List, Info Response RDF Data List, Info Response RDF Schema URL and Info Response RDF Schema List) in MIH_Get_Information response message in octets. If this field is not specified, the maximum size is set to 65,535. The actual maximum size forced by the IS server may be smaller than that specified by the IS client. |
| MIH_LOCATION_REPORT | String | Specifies the location information of Mobile Node |
| MIH_ROUTE_REPORT | String | Specifies the routing information of Mobile Node in future |

The MIH_Get_Information.request message is transmitted by MN 200 for requesting information related to specific information, attributes of the network interface as well as entire network capability.

As shown in tables 2 and 3, an exemplary handover method uses a new MIH_Get_Information.request message format which additionally includes parameters indicating location information and predicted routing information of the MN 200. This location and routing information is generated by a location information generator (not shown in drawings) in step S412. The location information generator estimates the MN 200 can predict its routing path with the support of GPS. When the MN 200 moves along the routing path configured by a navigator, the MN 200 adds the MIH_ROUTE_REPORT parameter to the network information request message to be transmitted to the MIIS 402. The format of the routing information also should be defined in common with the MIIS 402. By providing such routing information to the MIIS 402, the MIIS 402 can quickly determine and provide information on the surrounding networks. Accordingly, the MIIS 402 can predict and schedule the handovers of the MN 200 using the routing information, thereby improving handover efficiency and communication stability especially between the heterogeneous networks.

The respective integer values of parameter InfoQueryType correspond to TLV, RDF_DATA, RDF_SCHEMA_URL, and RDF_SCHEMA. When the InfoQueryType is specified as TLV, the InfoQueryParameters is a binary string containing encoded information element TLVs. When the InfoQueryType is specified as RDF_DATA, the InfoQueryParameters is a string which contains a SPARQL (Protocol and RDF Query language) query where the SPARQL query is supposed to contain an appropriate query for obtaining expected RDF/XML data. When the InfoQueryType is specified as RDF_SCHEMA_URL, the InfoQueryParameters is a null string. Finally, when InfoQueryType is specified as RDF_SCHEMA, the InfoQueryParameters carries either the URL of the extended schema the query originator wants to obtain or a null string when the URL of the extended schema is unknown.

In table 3, DestinationIdentifier indicates a local MIH function (MIHF) or a remote MIHF which will be the destination of this request. InforQueryBinaryDataList is an optional parameter indicating a list of binary queries. The order of queries in the list identifies the priority of the query. The first query has the highest priority to be processed by MIIS 402. Also, InfoQueryRDFDataList is an optional parameter indicating a list of RDF queries. Like the InfoQueryBinaryDataList, the order of the queries in the list identifies the priority of the query. The first query has the highest priority to be processed by the MIIS 402. InfoQueryRDFSchemaURL is another optional parameter indicating an RDF Schema URL query. Also, InfoQueryRDFSchemaList is an optional parameter indicating a list of RDF schema queries. The order of the queries in the list identifies the priority of the query. The first query has the highest priority to be processed by MIIS 402. MaxResponseSize is an optional parameter. This parameter specifies the maximum size of Info Response parameters, i.e., Info Response Binary Data List, Info Response RDF Data List, Info Response RDF Schema URL, and Info Response RDF Schema List in MIH_Get_Information.response message in octets. If this field is not specified, the maximum size is set to 65,535. The actual maximum size forced by the IS server may by smaller than that specified by the IS client.

Upon receiving the network information request message (MIH_Get_Information.request), the MIIS 402 searches for the surrounding networks on the basis of the current location and routing information of the MN 200 and determines candidate networks in step S416. At this time, one or more candidate networks can be selected. In the case that the routing information is used, the MIIS 402 can select the candidate networks that can provide the optimal quality of service (QoS) along the travel route of the MN 200. Accordingly, one or more networks can be selected as the candidate networks. For simplifying the present explanation, one surrounding network, i.e. the WMAN 403, will be selected as the candidate network using the current location information in FIGS. 4A and 4B. However, more than one surrounding network can be selected as the candidate networks.

After determining the candidate network, the MIIS 402 transmits a response message (MIH_Get_Information.response) containing the candidate network information to the MN 200 in response to the MIH_Get_Information.request in step S417. In a case that the MIH_Get_Information.request received from the MN 200 contains the expected routing information, if the candidate network information changes, for example due to a change in network status, the MIIS 402 may transmit information of another candidate network to the MN 200 or transmit information of the changed condition. This message can be provided to the MIH event service 322. If the changed candidate network information is received, the MN 200 performs a handover to the changed candidate network.

If the MIH_Get_Information.response is received, the MN 200 determines link relief information in step 420. In more detail, the link layer entity of the 802.11 interface 312 of the MN 200 notifies the MIH function unit 320 that the current 802.11 link is to be released in a preset time. Next, the MIH function unit 320 of the MN 200 reports the link relief to the MIH user unit 330. In response to a link scan request, the 802.16 interface 314 of the interface unit 310 is activated so as to receive network access information broadcast by the 802.16 WMAN 403 in steps S425. Since the candidate network is an 802.16 based WiBro network in this example, the network access information is broadcast by the candidate network. However, the candidate network is not limited to the WiBro network. The network access information broadcast by the WiBro network includes UL MAP, DL MAP, DCD, and UCD. The network access information includes information on the initial ranging performed for synchronization between the RAS and MN 200, and it is broadcasted by the RAS periodically.

The network access information received through the 802.16 interface 314 is transferred to the MIH user unit (or upper layer unit) 330. In this manner, the MN 200 performs the link scan process in step S430.

After completing the link scan, the MN 200, particularly the MIH function unit 320, transmits a candidate query request message (Candidate_Query.request) to the serving network 401 for initiating the handover in step 432. The Candidate_Query.request includes a link type identifier, candidate network identifiers, and information about operations required for the current link after handover. Upon receiving the Candidate_Query.request message, the serving network 401 transmits a handover (HO) query resource request message (Query_Resource.request) to the candidate network 403 in step S435. Since it is assumed that the WLAN 403 is the only candidate network, the serving network 401 transmits the Query_Resource.request to the WMAN 403. As described above, the candidate network 403 is the best network selected on the basis of the location information provided by the MN 200.

In response to the Query_Resource.request, the candidate network 403 transmits a query resource response message (Query_Resource.response) containing radio resource information to the serving network 401 in step S437. Upon receiving the Query_Resource.response, the serving network 401 transmits a Candidate_Query.response to the MN 200 in step S440.

Once the candidate network is determined, the MN 200 performs an operation for connecting to the handover candidate network 403 in step S445. In this example, since the handover candidate network 403 is a WiBro network, the MN 200 performs a ranging process for establishing a connection link with the candidate network 403.

After completing the ranging process, the 802.16 interface 314 of the interface unit 310 of the MN 200 notifies the MIH function unit of the handover completion and then the MIH function unit 320 notifies the MIH user unit 330 that the link switching is successfully completed in step S447. In this manner, the MN 200 completes the handover from the WLAN 401 to WMAN 403 (the WiBro network). Accordingly, the MN 200 can be served by the WLAN 401, from the WiBro network continuously in step S450. Since the MN 200 is connected to the new network 403, the old link established by the 801.11 interface 312 is released according the relief request of the MIH function unit 320.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and the like.

What is claimed is:

1. A handover method in a heterogeneous network environment, the method comprising:
   generating, at a mobile node, self-location information and self-travel route prediction information;
   transmitting the self-location information and the self-travel route prediction information to a management server which manages heterogeneous networks;
   searching, by the management server, surrounding networks using the self-location information;
   composing a set of candidate networks including at least one of the surrounding networks;
   transmitting information on the set of candidate networks to mobile node; and
   deciding, by the mobile node, a target handover network from among the candidate networks.

2. The handover method of claim 1, wherein the transmitting of the self-location information comprises transmitting a surrounding network information request message of a media independent handover function.

3. The handover method of claim 1, wherein the management server comprises a media independent handover information server.

4. The handover method of claim 1, further comprising obtaining the self-location information using at least one of a Location-Based Service (LBS) and a Global Positioning System (GPS).

5. A heterogeneous network handover method comprising:
   generating, at a mobile node having multiple standard interfaces, self-location information and self-travel route prediction information;
   transmitting the self-location information and self-travel route prediction information to a management server which manages heterogeneous networks;
   searching, by the management server, surrounding networks using the self-location information and self-travel route prediction information;
   selecting handover candidate networks from among the surrounding networks searched along a travel route extracted from the self-travel route prediction information;
   transmitting information on the candidate networks to the mobile node; and
   performing, at the mobile node, a handover to one of the candidate networks.

6. The heterogeneous network handover method of claim 5, wherein the transmitting of the self-location information and self-travel route prediction information comprises transmitting a surrounding network information request message of media independent handover function, and further wherein the transmitting of the information of the candidate networks comprises transmitting a surrounding network information response message of a media independent handover function.

7. The heterogeneous network handover method of claim 5, wherein the management server comprises a media independent handover information server.

8. The heterogeneous network handover method of claim 5, wherein the generating of the self-location information and the self-travel route prediction information comprises using at least one of a Location-Based Service (LBS), a Global Positioning System (GPS) and a navigator.

9. The heterogeneous network handover method of claim 5, wherein the transmitting of the information on the candidate networks comprises:
   monitoring to detect status changes of the candidate networks; and
   transmitting, if a status change is detected, a changed surrounding network information response containing changed information of the candidate networks.

10. A heterogeneous network handover system comprising:
    at least one mobile node for communicating with multiple heterogeneous networks, for generating self-location information, for transmitting the self-location information to a core network, and for performing a handover on the basis of candidate network information received from the core network; and
    a management server for managing the heterogeneous networks, for searching surrounding networks using the self-location information received from the mobile node, for selecting a set of handover candidate networks including at least one of the surrounding networks, and for transmitting information on the candidate networks to the mobile node,
    wherein the surrounding network information request message comprises self-travel route prediction information.

11. The heterogeneous network handover system of claim 10, wherein the self-location information is transmitted using a surrounding network information request message of a media independent handover function.

12. The heterogeneous network handover system of claim 10, wherein the management server comprises a media independent handover information server.

13. The heterogeneous network handover system of claim 10, wherein the self-location information is generated using at least one of a Location-Based Service (LBS) and a Global Positioning System (GPS).

14. The heterogeneous network handover system of claim 11, wherein a surrounding network information response message comprises information on candidate networks selected along the travel route of the mobile node corresponding to the self-travel route prediction information.

15. The heterogeneous network handover system of claim 10, wherein the management server monitors to detect status changes of the candidate networks and transmits, if a status change is detected, a changed surrounding network information response containing changed information of the candidate networks.

16. A heterogeneous network handover apparatus comprising:
    a plurality of radio interfaces for communicating with heterogeneous networks;
    a self-location information generator for generating self-location information and self-travel route prediction information; and
    a media independent handover function unit for transmitting a surrounding network information request message containing the self-location information and the self-travel route prediction information to a heterogeneous network management server and for receiving a reply message in response to the surrounding network information request message.

17. The heterogeneous network handover apparatus of claim 16, wherein the plurality of radio interfaces comprises:
- an Institute of Electrical and Electronic Engineers (IEEE) 802.11 interface;
- an IEEE 802.16 interface; and
- a cellular interface.

18. The heterogeneous network handover apparatus of claim 16, wherein the self-location information is generated using at least one of a Location-Based Service (LBS), a Global Positioning System (GPS) and a navigator.

19. The heterogeneous network handover apparatus of claim 16, wherein the media independent handover function unit comprises:
- an event service module:
- a command service module; and
- an information service module.

20. The heterogeneous network handover apparatus of claim 16, wherein the media independent handover function unit initiates a handover using information in the reply message.

* * * * *